US010332276B2

(12) United States Patent
Byron et al.

(10) Patent No.: US 10,332,276 B2
(45) Date of Patent: *Jun. 25, 2019

(54) PREDICTING A CHROMATIC IDENTITY OF AN EXISTING RECIPE AND MODIFYING THE EXISTING RECIPE TO MEET A DESIRED SET OF COLORS BY REPLACING EXISTING ELEMENTS OF THE RECIPE

(71) Applicant: International Business Machines Corporation, Armonk, NY (US)

(72) Inventors: Donna K. Byron, Petersham, MA (US); Carmine M. DiMascio, West Roxbury, MA (US); Florian Pinel, New York, NY (US); Timothy P. Winkler, Clinton, MA (US)

(73) Assignee: International Business Machines Corporation, Armonk, NY (US)

( * ) Notice: Subject to any disclaimer, the term of this patent is extended or adjusted under 35 U.S.C. 154(b) by 410 days.

This patent is subject to a terminal disclaimer.

(21) Appl. No.: 15/162,824

(22) Filed: May 24, 2016

(65) Prior Publication Data

US 2017/0345185 A1    Nov. 30, 2017

(51) Int. Cl.
*G06T 7/11* (2017.01)
*G06T 7/90* (2017.01)
(Continued)

(52) U.S. Cl.
CPC .............. *G06T 7/90* (2017.01); *G06F 16/285* (2019.01); *G06F 16/5838* (2019.01);
(Continued)

(58) Field of Classification Search
None
See application file for complete search history.

(56) References Cited

U.S. PATENT DOCUMENTS 5,334,404 A * 8/1994 Garcia ..................... A21D 8/00
426/104
7,075,041 B2 7/2006 Kruempelmann et al.
(Continued)

OTHER PUBLICATIONS

List of IBM Patents or Applications Treated as Related, May 24, 2016, 2 pages.
(Continued)

*Primary Examiner* — Michael Lebentritt
(74) *Attorney, Agent, or Firm* — Francis Lammes; Stephen J. Walder, Jr.; William J. Stock

(57) ABSTRACT

A mechanism is provided for modifying an existing recipe to meet a set of desired colors for a final food dish. Responsive to receiving a request to modify the existing recipe to meet the set of desired colors, at least one of the set of existing colors to be changed to meet the desired set of colors is identified. An ingredient-action-sequence triplet associated with each at least one existing color to be changed is identified and, from a corpus of ingredient-action-sequence triplets associated with other existing recipes, one or more substitution candidates that can produce the at least one target color are identified. The one or more substitution candidates are ranked based on how each candidate pairs best with other ingredients in the existing recipe. Based on a selection of a substitution candidate from the one or more substitution candidates, the existing recipe is modified with the substitute candidate.

17 Claims, 5 Drawing Sheets

(51) Int. Cl.

| | | |
|---|---|---|
| *G06K 9/62* | (2006.01) | |
| *G06K 9/48* | (2006.01) | |
| *G06T 7/00* | (2017.01) | |
| *G06Q 50/12* | (2012.01) | |
| *G06F 16/28* | (2019.01) | |
| *G06F 16/583* | (2019.01) | |
| *G06N 20/00* | (2019.01) | |

(52) U.S. Cl.
CPC ............ *G06K 9/481* (2013.01); *G06K 9/6218* (2013.01); *G06K 9/6256* (2013.01); *G06N 20/00* (2019.01); *G06Q 50/12* (2013.01); *G06T 7/0004* (2013.01); *G06T 7/11* (2017.01); *G06T 2207/10024* (2013.01); *G06T 2207/20081* (2013.01); *G06T 2207/30128* (2013.01)

(56) References Cited

U.S. PATENT DOCUMENTS

| | | | |
|---|---|---|---|
| 7,097,346 B2 * | 8/2006 | Bergman | D21H 23/78 366/136 |
| 8,718,824 B2 | 5/2014 | Baughman et al. | |
| 9,870,716 B1 * | 1/2018 | Rao | G09B 19/0092 |
| 2008/0213458 A1 | 9/2008 | Anderson | |
| 2009/0287678 A1 | 11/2009 | Brown et al. | |
| 2010/0124592 A1 | 5/2010 | Anderson | |
| 2011/0066587 A1 | 3/2011 | Ferrucci et al. | |
| 2011/0125734 A1 | 5/2011 | Duboue et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0149675 A1 | 6/2013 | Slone et al. | |
| 2013/0149679 A1 | 6/2013 | Tokuda et al. | |
| 2013/0185119 A1 | 7/2013 | Palao et al. | |
| 2014/0188566 A1 | 7/2014 | Pinel et al. | |
| 2015/0058065 A1 | 2/2015 | Pinel et al. | |
| 2015/0170543 A1 | 6/2015 | Shahar et al. | |
| 2015/0199608 A1 | 7/2015 | Pinel et al. | |
| 2015/0212661 A1 * | 7/2015 | Robberechts | G06F 3/0482 715/810 |
| 2015/0220592 A1 * | 8/2015 | Robberechts | G06F 17/30386 715/810 |
| 2015/0260699 A1 | 9/2015 | Minvielle | |
| 2017/0344892 A1 * | 11/2017 | Byron | G06N 7/005 |

OTHER PUBLICATIONS

"IBM Chef Watson", IBM Corporation, https://www.ibmchefwatson.com/, accessed online Nov. 11, 2015, 1 page.

High, Rob, "The Era of Cognitive Systems: An Inside Look at IBM Watson and How it Works", IBM Corporation, Redbooks, Dec. 12, 2012, 16 pages.

Mccord, M.C. et al., "Deep parsing in Watson", IBM J. Res. & Dev. vol. 56 No. 3/4 Paper 3, May/Jul. 2012, pp. 3:1-3:15.

Yuan, Michael J., "Watson and healthcare, How natural language processing and semantic search could revolutionize clinical decision support", IBM developerWorks, IBM Corporation, Apr. 12, 2011, 14 pages.

* cited by examiner

PREDICTING A CHROMATIC IDENTITY OF AN EXISTING RECIPE AND MODIFYING THE EXISTING RECIPE TO MEET A DESIRED SET OF COLORS BY REPLACING EXISTING ELEMENTS OF THE RECIPE

BACKGROUND

The present application relates generally to an improved data processing apparatus and method and more specifically to mechanisms for predicting a chromatic identity of an existing recipe and modifying the existing recipe to meet a desired set of colors by replacing existing elements of the recipe.

Various computer-based systems exist for assisting people with the organization of their cooking recipes for quick retrieval and use. These computing systems are essentially database systems that store data and retrieve the data in response to user requests.

Recently, International Business Machines (IBM) Corporation of Armonk, N.Y., has released an intelligent cooking recipe application referred to as IBM Chef Watson™. IBM Chef Watson™ searches for patterns in existing recipes and combines them with an extensive database of scientific (e.g., molecular underpinnings of flavor compounds) and cooking related information (e.g., what ingredients go into different food dishes) with regard to food pairings to generate ideas for unexpected combinations of ingredients. In processing the database, IBM Chef Watson™ learns how specific cuisines favor certain ingredients and what ingredients traditionally go together, such as tomatoes and basil. The application allows a user to identify ingredients that the user wishes to include in the recipe, ingredients that the user wishes to exclude, as well as specify the meal time (breakfast, lunch, dinner), course (appetizer, main, dessert), and the like.

The IBM Chef Watson™ has inspired the creation of an IBM Chef Watson™ food truck, a cookbook entitled *Cognitive Cooking with Chef Watson*, Sourcebooks, Apr. 14, 2015, and various recipes including a barbecue sauce referred to as Bengali Butternut BBQ Sauce.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for modifying an existing recipe to meet a set of desired colors for a final food dish. Responsive to receiving a request to modify the existing recipe to meet the set of desired colors, the set of desired colors has at least one target color that is different from a set of existing colors of the final food dish, the illustrative embodiment identifies at least one of the set of existing colors to be changed to meet the desired set of colors. The illustrative embodiment identifies an ingredient-action-sequence triplet associated with each at least one existing color to be changed in the existing recipe. From a corpus of ingredient-action-sequence triplets associated with other existing recipes, the illustrative embodiment identifies one or more substitution candidates that can produce the at least one target color. The illustrative embodiment ranks the one or more substitution candidates based on how each candidate pairs best with other ingredients in the existing recipe. Based on a selection of a substitution candidate from the one or more substitution candidates, the illustrative embodiment modifies the existing recipe with the substitute candidate.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
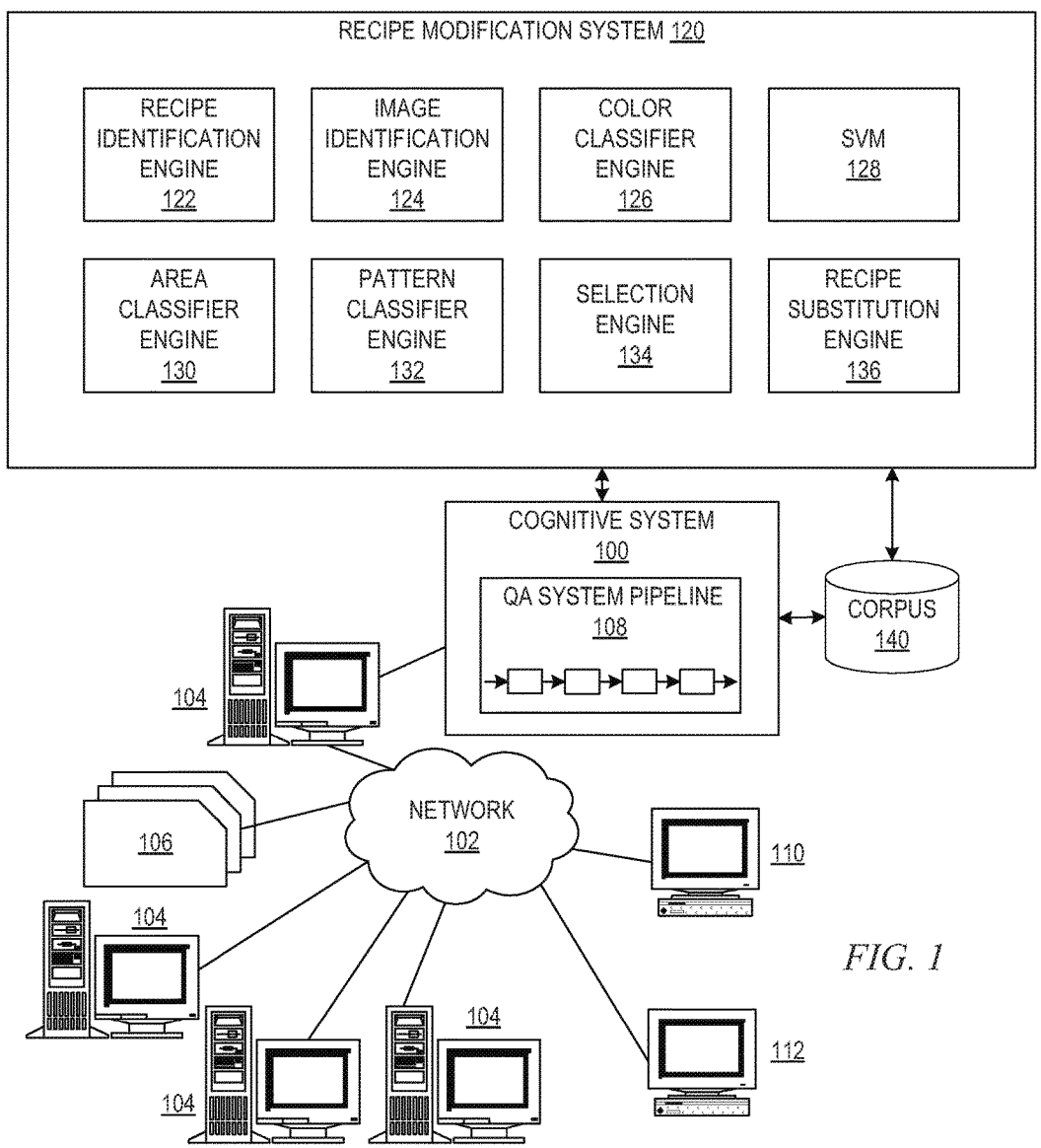
FIG. 1 depicts a schematic diagram of one illustrative embodiment of a question/answer creation (QA) system in a computer network.

The illustrative embodiments provide mechanisms for automatically generating a modified recipe recommendation based on a color associated with each ingredient in an existing recipe and a desired color for a final outcome of the food dish. There are a number of reasons why a person may want to modify an existing recipe by including additional ingredients or replacing ingredients in the recipe in order to modify the color of the final food dish including:

(1) to make the final food dish more appealing to the human eye (e.g., meals to encourage children to eat);

(2) to make the final food dish color coordinate with other food that is to be plated together (e.g., restaurant dishes made for a special event, such as Fourth of July and a red, white, and blue theme); and (3) to make the final food dish color coordinate to meet a particular theme (e.g., food prepared to meet a particular color theme such as for a wedding where particular food is to be prepared).

However, adding additional ingredients or replacing ingredients in a recipe to create a particular color is not a simple task, i.e. one must take into consideration the complex interplay of ingredients as well as the quantities and preparation of the ingredients both alone and in combination with the other ingredients, including timing in the sequential order of preparation instructions to introduce the ingredient, in order to generate a particularly colored food dish. Current cooking applications and recipe based computing systems do not provide the complex cognitive capabilities to adequately evaluate such complex interactions of ingredients as well as determine proper quantities and preparation of such ingredients for adding ingredients or replacing ingredients in existing recipes to produce a particularly colored food dish.

Current recipe based mechanisms are either fixed databases of recipes that may be searched to identify recipes having certain ingredients, types of foods, meet certain dietary requirements, or the like, or use template based recipe mechanisms that have limitations to their functionality for merely substituting ingredients of the same, e.g., substituting one type of vegetable for another type of vegetable. However, in the fixed database mechanisms, these recipes are fixed and are merely selected based on their fixed set of characteristics. In the case of template based recipe mechanisms, the substitution is simply a straight substitution of one ingredient for another ingredient of the same type without any consideration as to the complexity of the different ingredients, their interactions with other ingredients in the recipe, and/or what the substitution of a different ingredient will do to the final color of the food dish. One cannot simply replace 6 ounces of onions with 6 ounces of carrots and achieve a similar result or even a desirable food dish when a desired color is green.

There are no reliable mechanisms that use cognitive computing to determine proper color contributions based on the color of the ingredient, quantities, timing, and preparation instructions for introducing new ingredients into existing recipes such that a palatable food dish of a particular color is generated. This is especially true when the ingredient to be substituted is significantly different from an intended final color for the food dish.

Thus, the illustrative embodiments provide cognitive mechanisms for modifying an existing recipe to include a new ingredient and/or replace an ingredient, even in the case of the ingredient being vastly different from existing ingredients in the existing recipe, in order to obtain a desired color for a final outcome of the food dish. That is, the illustrative embodiments cognitively provide for taking into account a desired color of a food dish and visualizing an expected color or color profile for the food dish based on the colors of the contributing ingredients. The illustrative embodiments also cognitively provide for the ability of the user to adjust the color profile of a recipe by including a new ingredient and/or replacing an ingredient in order to obtain a desired color for a final outcome of the food dish.

In order to modify an existing recipe to include a new ingredient and/or replace an ingredient in order to obtain a desired color for a final outcome of the food dish, the illustrative embodiments first enter a training phase to identify and learn a respective color contribution of each ingredient, based on when and how the ingredient is introduced into recipe. Thus, for a corpus of existing recipes, the illustrative embodiments determine, for an existing recipe with a picture of the food dish, a color contribution of each ingredient to a particular food dish based on how the ingredient is introduced into the existing recipe, a quantity of the ingredient, that is being introduced, an action being performed when introducing the ingredient into the existing recipe, and a timing or location in a sequence of preparation instructions for introduction of the ingredient resulting in the final food dish.

That is, color may be expressed by numeric values (e.g. RGB values) and color similarity is computed using a distance, such as a metric distance, between RGB vectors associated with different pixels of a picture of the food dish. Basic colors (green, orange, purple, etc.) are defined as balls centered on a given RGB value. For a given food picture, the mechanisms of the illustrative embodiments separate the food from the background using techniques such as global adaptive thresholding, edge detection, or the like. The mechanisms then cluster the foreground, i.e. the food dish, into areas of similar color. The mechanisms then build a classifier for each basic color. That is, for each recipe in a corpus of recipes, the mechanisms build a sparse binary feature vector where each feature indicates the presence or absence of a given ingredient-action-sequence triplet, and where an ingredient-action-sequence triplet consists of the ingredient, the action performed with regard to the ingredient, and where in the recipe the ingredient/action occurs. For example, in a recipe for a beet risotto with parsley, the generated feature vector contains zeroes everywhere except at the indices representing the following ingredient-action-sequence triplets:

(oil, heat, first ⅓ of the recipe instructions)
(rice, add, first ⅓ of the recipe instructions)
(white wine, add, first ⅓ of the recipe instructions)
(beet juice, add, second ⅓ of the recipe instructions)
(parsley, sprinkle, third ⅓ of the recipe instructions)

Due to the size of the vectors that are generated, the mechanisms may incorporate space reduction by grouping ingredients of the same type and color (green herb instead of parsley), grouping cooking actions into categories, and/or representing the sequence by a simple tier number.

Once the sparse binary feature vector has been generated for a particular recipe, the mechanisms mark the recipe as a positive example if the recipe comprises at least one area of the given basic color. For example, the beet risotto recipe, which looks purple with green dots, is a positive example for the purple class and green class. Utilizing all of the sparse binary feature vectors for the existing recipes in the corpus of recipes, the illustrative embodiments train a model using a support vector machine (SVM), or other supervised machine learning algorithms, as a basic color classifier to analyze other recipes that do not have an associated picture of the food dish in order to predict a color from a given sparse binary feature vector.

Therefore, for an existing recipe without a picture of the food dish, the mechanisms of the illustrative embodiments build a sparse binary feature vector representing the ingredient-action-sequence triplets found in the recipe. The mechanisms then pass the sparse binary feature vector to the above-described SVM models so as to predict the colors appearing in the final food dish. Identifying the colors of the final food dish is used by the mechanisms of the illustrative embodiments to visualize recipes that do not come with pictures. For example, for a beet risotto with shaved parmesan recipe created by a recipe generation engine, such as IBM Chef Watson™, the mechanisms of the illustrative embodiments would identify that such a recipe would be positive with purple and yellow classifiers.

In a further embodiment, in addition to identifying the colors of the final food dish, the mechanisms of the illustrative embodiments also predict the area of each positive color. The mechanisms replace the sparse binary feature vector with a decimal vector, where each value is an ingredient proportion using a regression SVM algorithm in place of the binary classifier to predict what portion of the dish will be of a given color.

The mechanisms may also predict the pattern of each color area. Using the same sparse binary feature vector as above, the mechanisms create classifiers that predict shapes and patterns, such as a large area, lots of little dots, or the like, based on the instructions associated with the recipe, such as spread the sauce around the pan, sprinkle the shaved parmesan cheese on top, or the like). Using the above embodiments, the mechanisms may then generate a rudimentary image of the recipe. For example, a beet risotto with shaved parmesan cheese would be a purple disc with yellow dots. When using an SVM algorithm, for each classifier, the prediction may be analyzed to identify the positive element (s) of the sparse binary feature vector, and therefore which ingredient(s) make the largest contribution to the predicted score. This provides a correlation with the results of classifiers that address orthogonal concerns, such as color and pattern, i.e. the yellow and the little dots both come from the shaved parmesan cheese. Specific patterns on the training set used to train the SVM may either be annotated manually or evaluated using image recognition techniques.

In another embodiment, the illustrative embodiment provides mechanisms that provide recommendations to modify the recipe to reach the desired color using the rudimentary image generated for the recipe. In order to modify the existing recipe to include a new ingredient and/or replace an ingredient in order to obtain a desired color for a final outcome of the food dish, the illustrative embodiments provide a selection mechanism that allows the user to select a desired area of the rudimentary image as well as set hue/saturation sliders or a color picking tool for the selected area, such as those used in image editing software. By selecting a color area on the rudimentary image and moving one of the set of hue/saturation sliders, the mechanisms utilize a recipe generation engine, which determines the ingredient(s) responsible for the selected area of the rudimentary image. For example, if the selected area of the rudimentary image were the yellow dots, then the recipe generation engine would identify that the yellow little dots are the shaved parmesan cheese. Then, based on the movement of the one of the set of hue/saturation sliders or a color picking tool, such as moving from yellow to green, then the recipe generation engine may identify substitution candidates that can produce the target color, such as parsley, cilantro, or chives, coupled with the sprinkle action added towards the end of the recipe instructions so as to produce green little dots.

Determining which of the identified substitution candidates to select is determined based on the candidate that pairs best with the other ingredients, such as beets pair better with chives than cilantro. The identification of the substitution candidates and determination of which candidate from the identified substitution candidates to select based on how the candidate pairs best with the other ingredients is the basis of a related application entitled "Modifying Existing Recipes to Incorporate Additional or Replace Existing Ingredients", Ser. No. 14/938,907, filed Nov. 12, 2015, which is hereby incorporated by reference.

In still another embodiment, the mechanisms of the illustrative embodiment provide for adding an additional color to a recipe. That is, the mechanisms provide a plurality of patterns and a selection tool to add a desired pattern to the rudimentary image, select a color for the added pattern, using the set of hue/saturation sliders or a color picking tool associated with the desired pattern, and identify candidates that can produce the target color and pattern, and make recommendations as to the candidate that pairs best with the other ingredients. For example, to add orange lines across the plate, the user would select the line pattern and add the lines to the rudimentary image. Then the user, would select an orange color using the set of hue/saturation sliders or a color-picking tool. The recipe generation engine would then use an orange classifier and a line classifier to select weights that make the highest contributions, trace the weights back to ingredient-action-sequence triplets that produce orange colors as well as ingredient-action-sequence triplets that produce lines, and identify those ingredient-action-sequence triplets from both sets of ingredient-action-sequence triplets that interest each other, i.e. orange and lines. The result might be orange salad dressing, reduced orange juice, or the like, drizzled across the top of the food dish.

Thus, the mechanisms of the illustrative embodiments provide an intelligent cognitive system for automatically generating a modified recipe recommendation based on a color associated with each ingredient in the recipe and a desired color for a final outcome of the food dish. Furthermore, the modified recipe may also include additional ingredients so as to account for an additional colored pattern added to the recipe.

Having given an overview of operations in accordance with one illustrative embodiment, before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general-purpose hardware, software instructions stored on a medium such that the instructions are readily executable by specialized or general-purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
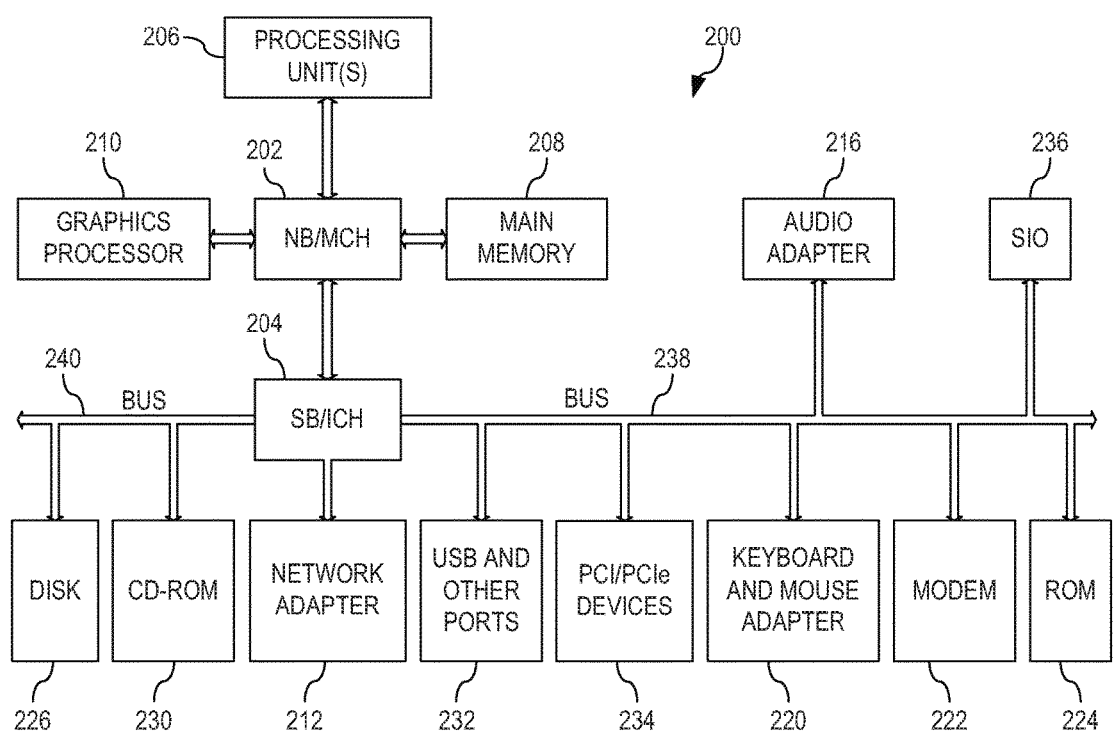
FIG. 2 is a block diagram of an example data processing system in which aspects of the illustrative embodiments are implemented.
Figure 3:
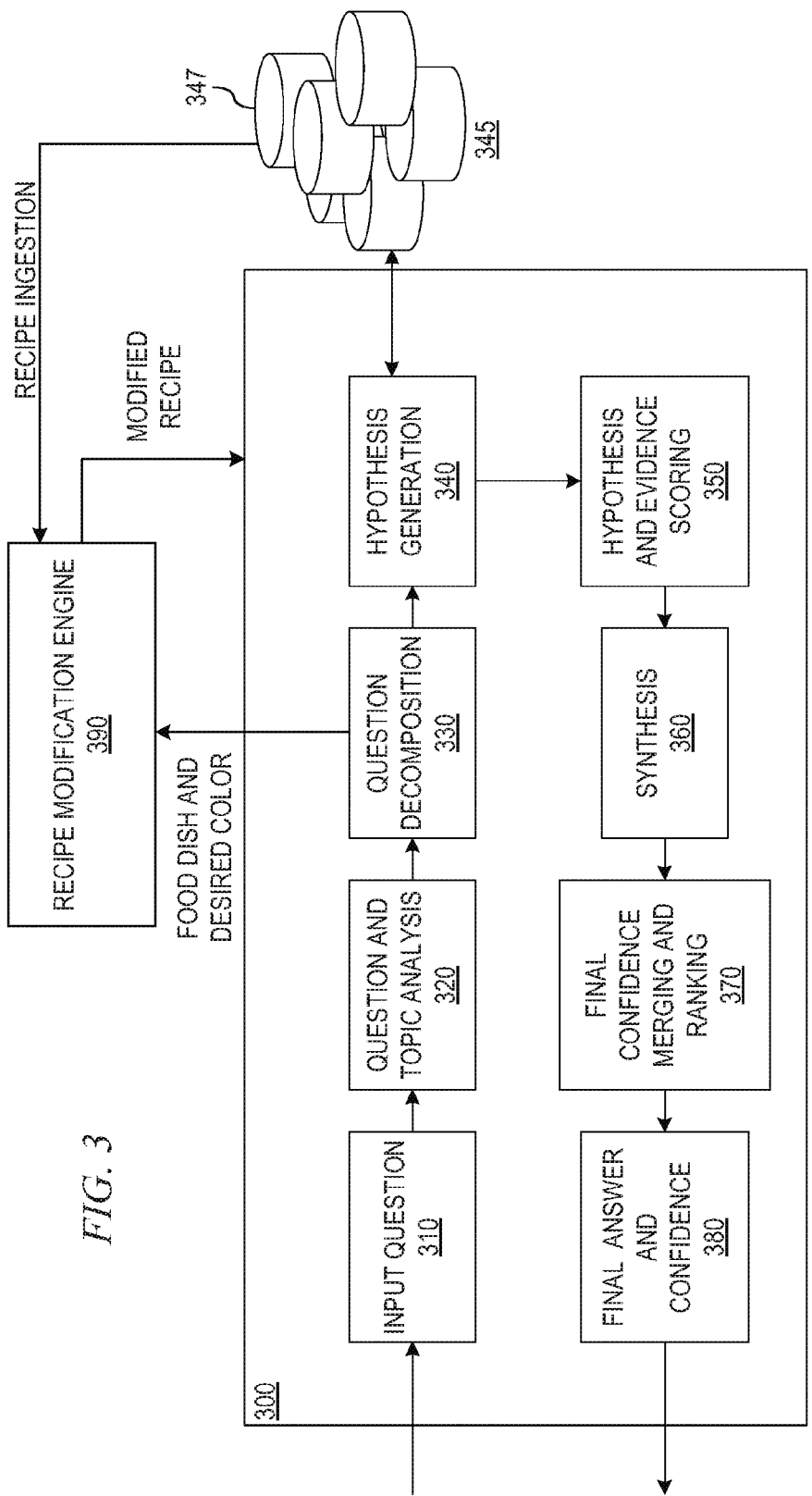
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments. FIGS. 1-3 are provided hereafter as example environments in Which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention. In fact, while a QA system architecture will be described with regard to FIGS. 1-3, the illustrative embodiments do not require the presence of a QA system in order to operate. This is only one example implementation and other implementations and illustrative embodiments may utilize other types of data processing systems without departing from the spirit or scope of the present invention.

FIGS. 1-3 are directed to describing an example cognitive system implementing a Question Answering (QA) pipeline (also referred to as a Question/Answer pipeline or Question and Answer pipeline), methodology, and computer program product with Which the mechanisms of the illustrative embodiments are implemented. As will be discussed in greater detail hereafter, the illustrative embodiments are integrated in, augment, and extend the functionality of these QA mechanisms of the cognitive system with regard to modifying an existing recipe to meet a desired color or set of colors. For example, the QA pipeline may receive as an input question a request to add or change a color associated with a specific food dish, e.g., "How do I add green dots to a risotto?" Thus, the request, which may or may not be presented in the form of a natural language question, specifies the color and or pattern to be integrated into the recipe and the identity of the original existing recipe that is the subject of the modification.

Thus, it is important to first have an understanding of how question and answer creation in a cognitive system implementing a QA pipeline is implemented before describing how the mechanisms of the illustrative embodiments are integrated in and augment such QA mechanisms. It should be appreciated that the QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system, which can process human readable language and identify inferences between text passages with human-like high accuracy at speeds far faster than human beings and on a larger scale. In general, such cognitive systems are able to perform the following functions:

Navigate the complexities of human language and understanding
  Ingest and process vast amounts of structured and unstructured data
  Generate and evaluate hypothesis
  Weigh and evaluate responses that are based only on relevant evidence
  Provide situation-specific advice, insights, and guidance
  Improve knowledge and learn with each iteration and interaction through machine learning processes
  Enable decision making at the point of impact (contextual guidance)
  Scale in proportion to the task
  Extend and magnify human expertise: and cognition
  Identify resonating, human-like attributes and traits from natural language
  Deduce various language specific or agnostic attributes from natural language
  High degree of relevant recollection from data points (images, text, voice) (memorization and recall)
  Predict and sense with situational awareness that mimic human cognition based on experiences
  Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these questions and answer attributes of the content.

Operating on such content, the QA pipeline generates answers for input questions using a plurality of intensive analysis mechanisms that evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question answering (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, subsystems, and/or devices other than those that are depicted herein.

The cognitive system 100 is configured to implement a QA pipeline 108 that receive inputs from various sources. For example, the cognitive system 100 receives input from the network 102, a corpus of data 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g. the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g. cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 that comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract, the major features of the question, and which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, in accordance with some illustrative embodiments, the cognitive system 100 is further augmented, in accordance with the mechanisms of the illustrative embodiments, to include logic implemented in specialized hardware, software executed on hardware, or any combination of specialized hardware and software executed on hardware, for implementing a recipe modification system 120.

The operation of the recipe modification system 120 may be initiated in response to receiving a request or input question directed to modifying an existing recipe to meet a desired set of colors of the final food dish. The request or input question may be provided via a graphical user interface through which a user selects a food dish and, based on a color associated with each ingredient in the recipe and the identified positive colors of the final food dish, requests one or more desired color changes for a final outcome of the food dish, such as previously described above.

However, in order to modify an existing recipe to include a new ingredient and/or replace an ingredient in order to obtain a desired color for a final outcome of the food dish, recipe modification system 120 first enters a training phase to identify and learn a respective color contribution of each ingredient, based on when and how the ingredient is introduced into recipe. Thus, for a corpus 140 of existing recipes, the illustrative embodiments determine, for an existing recipe with a picture of the food dish, a color contribution of each ingredient to a particular food dish based on how the ingredient is introduced into the existing recipe, a quantity of the ingredient that is being introduced, an action being performed when introducing the ingredient into the existing recipe, and a timing or location in a sequence of preparation instructions for introduction of the ingredient resulting in the final food dish.

The recipe modification system 120 utilizes a recipe identification engine 122 to identify one or more existing recipes from a corpus 140 of existing recipes. The recipe modification system 120 determines whether the existing recipes have an associated picture of the food dish that is generated based on the recipe. If there is an associated picture, an image identification engine 124 of the recipe modification system 120 separates the food from the background using techniques such as global adaptive thresholding, edge detection, or the like. The image identification engine 124 then clusters the foreground, i.e. the food dish, into areas of similar color. For each analyzed picture associated with each identified recipe in the corpus 140 of existing recipes, a color classifier engine 126 of the recipe modification system 120 builds a sparse binary feature vector where each feature indicates the presence or absence of a given ingredient-action-sequence triplet, and where an ingredient-action-sequence triplet consists of the ingredient, the action performed with regard to the ingredient, and where in the recipe the ingredient/action occurs. Due to the size of vector that are generated, the color classifier engine 126 may incorporate space reduction by grouping ingredients of the same type and color (green herb instead of parsley), grouping cooking actions into categories, and/or representing the sequence by a simple tier number.

Once the sparse binary feature vector has been generated for a particular recipe, the color classifier engine 126 marks the recipe as a positive example if the recipe comprises at least one area of the given basic color. Utilizing all of the sparse binary feature vectors for the identified recipes in the corpus 140 of existing recipes, the recipe modification system 120 may train a model using a support vector machine (SVM) 128, or other supervised machine learning algorithms, as a basic color classifier to analyze other recipes that do not have an associated picture of the food dish in order to predict a color from a given sparse binary feature vector.

Therefore, for an existing recipe associated with the identified food dish and without a picture of the food dish, the color classifier engine 126 builds a sparse binary feature vector representing the ingredient-action-sequence triplets found in the recipe. The color classifier engine 126 then passes the vector to the SVM 128 so as to predict the colors appearing in the final food dish. Identifying the colors of the final food dish is used by the recipe modification system 120 to visualize recipes that do not come with pictures. For example, for a beet risotto with shaved parmesan recipe created by a recipe generation engine, such as IBM Chef Watson™, the recipe modification system 120 would identify that such a recipe would be positive with purple and yellow classifiers.

In a further embodiment, in addition to identifying the colors of the final food dish, the recipe modification system 120 also provides an area classifier engine 130 to predict the area of each of the positive colors. The recipe modification system 120 replaces the sparse binary feature vector with a decimal vector, where each value is an ingredient proportion and the area classifier engine 130 uses a regression SVM algorithm in place of the binary classifier to evaluate the relation portion of the dish where the color appears.

The recipe modification system 120 may also provide a pattern classifier engine 132 for predicting a pattern of each color area. Using the same sparse binary feature vector as above, pattern classifier engine 132 creates classifiers that predict shapes and patterns, such as a large area, lots of little dots, or the like, based on the instructions associated with the recipe, such as spread the sauce around the pan, sprinkle the shaved parmesan cheese on top, or the like. Using the above embodiments, the recipe modification system 120 may then generate a rudimentary image of the recipe. For example, a beet risotto with shaved parmesan cheese would be a purple disc with yellow dots. When using an SVM algorithm, for each classifier, the recipe modification system 120 may analyze the prediction to identify the positive element(s) of the sparse binary feature vectors, and therefore which ingredient(s) make the largest contribution to the predicted score. This provides a correlation with the results of classifiers that address orthogonal concerns, such as color and pattern, i.e. the yellow and the little dots both come from the shaved parmesan cheese. Specific patterns on the training set used to train the SVM 128 may either be annotated manually or evaluated using image recognition techniques.

In another embodiment, the recipe modification system 120 provides recommendations to modify the recipe to reach the desired color using the rudimentary image generated for the recipe. That is, response to receiving a request or input question directed to modifying an existing recipe to meet a desired set of colors of the final food dish, the recipe modification system 120 provides a selection engine 134 that allows the user to select a desired area of the rudimentary image as well as set hue/saturation sliders or a color picking tool for the selected area, such as those used in image editing software. By selecting a color area on the rudimentary image and moving one of the set of hue/saturation sliders or the color-picking tool, the recipe modification system 120 utilizes a recipe substitution engine 136, which determines the ingredient(s) responsible for the selected area of the rudimentary image. For example, if the selected area of the rudimentary image were the yellow dots, then the recipe substitution engine 136 would identify that the yellow little dots are the shaved parmesan cheese. Then, based on the movement of the one of the set of hue/saturation sliders or the color picking tool, such as moving from yellow to green, then recipe substitution engine 136 may identify substitution candidates that can produce the target color, such as parsley, cilantro, or chives, coupled with the sprinkle action added towards the end of the recipe instructions so as to produce green little dots.

Determining which of the identified substitution candidates to select is determined based on the candidate that pairs best with the other ingredients, such as beets pair better with chives than cilantro. The identification of the substitution candidates and determination of which candidate from the identified substitution candidates to select based on how the candidate pairs best with the other ingredients is the basis of a related application entitled "Modifying Existing Recipes to Incorporate Additional or Replace Existing Ingredients", Ser. No. 14/938,907, filed Nov. 12, 2015, which is hereby incorporated by reference.

In still another embodiment, response to receiving a request or input question directed to modifying an existing recipe to meet a desired set of colors of the final food dish, the recipe modification system 120 provides for adding an additional color to a recipe. That is, the selection engine 134 provides a plurality of patterns and a selection tool to add a desired pattern to the rudimentary image, select a color for the added pattern, using the set of hue/saturation sliders or other color picking tools associated with the desired pattern, and identify candidates that can produce the target color and pattern, and make recommendations as to the candidate that pairs best with the other ingredients. For example, to add orange lines across the plate, the user would select the line pattern and add the lines to the rudimentary image. Then the user, using the selection engine 134, would select an orange color using the set of hue/saturation sliders or other color picking tools. The color classifier engine 126 would then use an orange classifier and a line classifier to select weights that make the highest contributions, trace the weights back to ingredient-action-sequence triplets that produce orange colors as well as ingredient-action-sequence triplets that produce lines, and identify those ingredient-action-sequence triplets from both sets of ingredient-action-sequence triplets that intersect each other, i.e. orange and lines. Using the ingredient-action-sequence triplets from both sets of ingredient-action-sequence triplets that intersect, the recipe substitution engine 136 may identify the use of orange salad dressing, reduced orange juice, or the like, drizzled across the top of the food dish.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e., "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, the QA system pipeline 300 may operate in conjunction with a recipe modification system 390, which may be an instance of the recipe modification system 120 described above with regard to FIG. 1. The QA system pipeline 300 may receive an input question 310 that is directed to modification of an existing recipe based on a desired color for the final food dish, e.g., "How can I change a purple and yellow risotto to a purple and green risotto?" which specifies the existing food dish is to be modified by replacing and/or adding one or more ingredients in the identified existing recipe. The identification of these features of the input question may be performed through the parsing with topic analysis and question decomposition stages 320 and 330 of the QA system pipeline 300 described previously, for example. For example, in stage 320 it may be determined that the input question 310 has a topic of modifying an existing recipe to have a set of defined colors Which triggers the need to utilize the recipe modification engine 390 to facilitate generating the answer to the input question 310. The question decomposition stage 330 may be used to identify the specific recipe to be modified and the ingredients that are the subject of the modification as well as whether the ingredients are being added/replaced.

This information may then be forwarded to the recipe modification engine 390 that operates in the manner described above to generate an answer to the input question 310. In doing so, the recipe modification engine 390, which is assumed to have already ingested a corpus or corpora 345, 347 comprising existing recipes, identifies the positive classifiers associated with the recipe, identifies one or more areas and/or patterns of the food dish as a rudimentary image of the recipe, allows the user to select one or more of the one or more areas of the recipe and change the color associated with that one or more areas, and identify substitution candidates that pairs best with the other ingredients of the recipe so as to achieve the desired color.

The recipe modification engine 390 then returns the modified recipe to the QA system pipeline 300 as the final answer to the input question 310. Since the final answer is provided by the recipe modification engine 390, the other stages of the QA system pipeline 300 may be bypassed and the final answer may be output directly as the answer to the input question 310. The output may comprise the natural language text of the modified recipe and/or ingredient listing generated when generating the modified existing recipe as discussed above.

Figure 4:
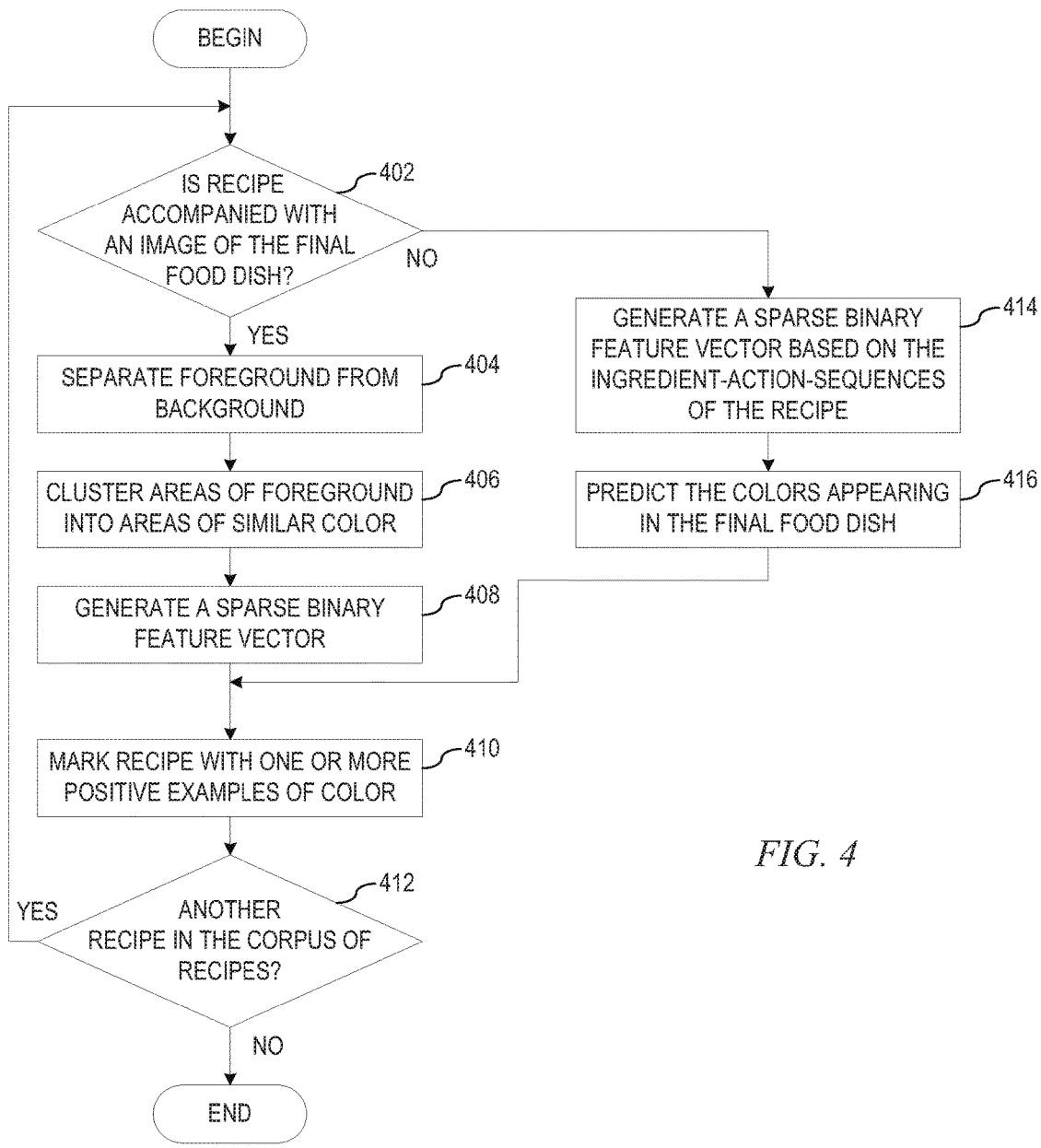
FIG. 4 is a flowchart outlining an example operation for training a support vector machine (SVM) or other supervised machine learning algorithms for modifying an existing recipe based on a color associated with each ingredient in the recipe and a desired color for a final outcome of the food dish in accordance with one illustrative embodiment.
Figure 5:
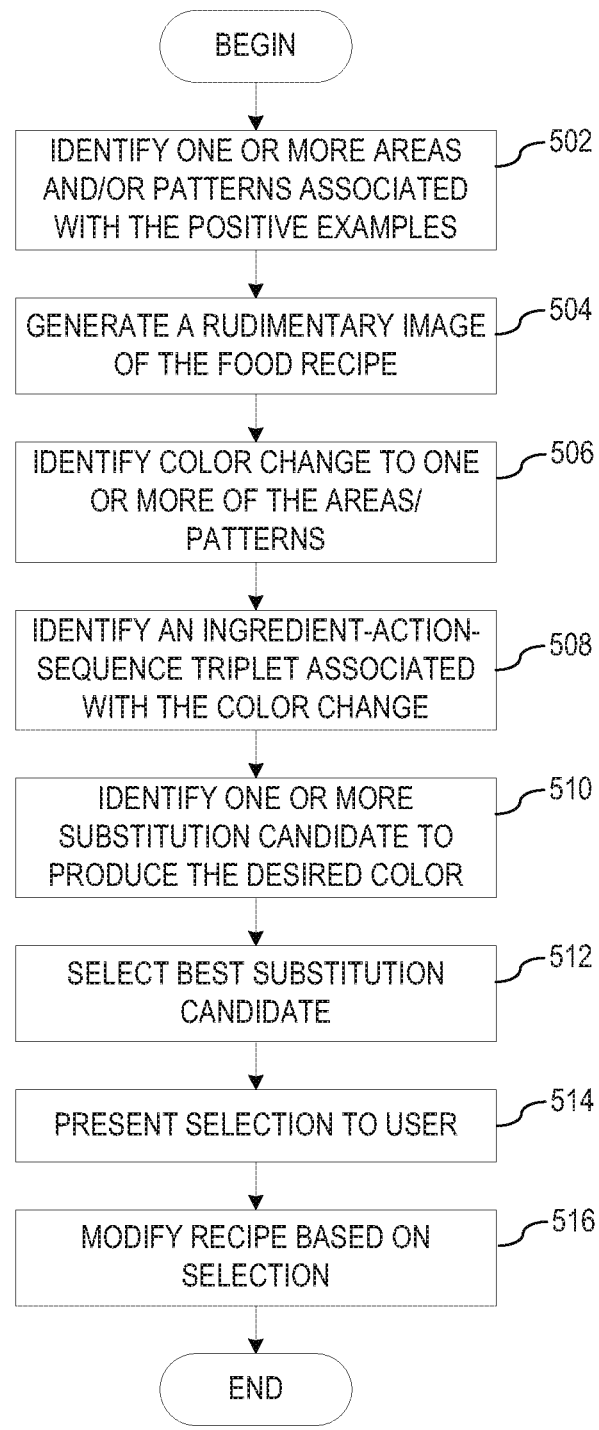
FIG. 5 is a flowchart outlining an example operation for modifying an existing recipe based on a color associated with each ingredient in the recipe and a desired color for a final outcome of the food dish in accordance with one illustrative embodiment.

FIGS. 4 and 5 are flowcharts outlining an example operation for modifying an existing recipe based on a color associated with each ingredient in the recipe and a desired color for a final outcome of the food dish in accordance with one illustrative embodiment. As shown in FIG. 4, the operation for generating a modified recipe based on a color associated with each ingredient in the recipe and a desired set of colors for a final outcome of the food dish starts by training a support vector machine (SVM) or other supervised machine learning algorithms, to identify and learn a respective color contribution of each ingredient, based on when and how the ingredient is introduced into recipe. Thus, as the operation begins, for each recipe in a corpus of existing recipes, a determination is made as to whether the recipe is accompanied with an image of the final food dish (step 402). If at step 402 the recipe is accompanied by an image of the final food dish, then food in the image (foreground) is separated from the background (step 404) using techniques such as global adaptive thresholding, edge detection, or the like.

The remaining foreground is then clustered into areas of similar color (step 406). A sparse binary feature vector is then generated where each feature indicates the presence or absence of a given ingredient-action-sequence triplet, and where an ingredient-action-sequence triplet consists of the ingredient, the action performed with regard to the ingredient, and where in the recipe the ingredient/action occurs (step 408). The recipe is then marked with one or more positive examples if the recipe comprises at least one area of the given basic color (step 410). The mechanisms determine whether there is another recipe to examine in the corpus of recipes (step 412). If at step 412 there is another recipe in the corpus of recipes, then the operation returns to step 402. If at step 412 there is no other recipe in the corpus of recipes, then the operation of the training portion a support vector machine (SVM) or other supervised machine learning algorithms ends.

If at step 402 the recipe fails to be accompanied by an image of the final food dish, a sparse binary feature vector is generated based on the ingredient-action-sequences of the recipe (step 414). The sparse binary feature vector is then passed to the above-described SVM models so as to predict the colors appearing in the final food dish associated with the recipe that fails to be accompanied by an image of the final food dish (step 416). That is, as each recipe with a picture is analyzed by the cognitive system of the illustrative embodiments, the sparse binary feature vectors associated with each ingredient-action-sequence triplet of those recipes are stored for use in recipes that do not have an associated image. The operation then proceeds to step 410. It should be noted that, typically, the above operation would be executed for those recipes that have associated images and then executed on those recipes without an image in order to use the model generated by those recipes with images to accurately predict the color(s) of recipes without an image.

As shown in FIG. 5, as the operation begins, responsive to receiving an input request/question requesting a modified recipe for a particular food dish and a desired set of colors, one or more areas associated with each of the positive colors in the recipe is identified as well as, if possible, one or more patterns associated with each of the positive colors in the recipe (step 502). Using the identified colors, areas, and/or patterns, a rudimentary image of the recipe is generated (step 504). Using a selection mechanism and a color modification mechanism, either the system will automatically change one or more colors of a selected area of the rudimentary drawings based on the input desired colors or the user may use a selection tool to select an area of the rudimentary drawing and use a set of hue/saturation sliders or a color picking tool to indicate a desired color change to that area (step 506). Based on the selected area and the desired color, one or more ingredient-action-sequence triplets of the recipe associated with that color are identified (step 508). One or more substitution candidates that can produce the target color coupled with a defined action are then identified (step 510) and a candidate from the identified substitution candidates is selected based on the candidate that pairs best with the other ingredients (step 512). The best candidate or a ranked form of the identified substitution candidates are then presented to the user for final selection (step 514). Based on the user's final substitute selection, the recipe is modified with the substitute (step 516), with the operation terminating thereafter.

Thus, the illustrative embodiments provide cognitive mechanisms for predicting a chromatic identity of an existing recipe and modifying an existing recipe to include a new ingredient and/or replacement an ingredient, even in the case of the ingredient being vastly different from existing ingredients in the existing recipe, in order to obtain a desired color for a final outcome of the food dish. That is, the illustrative embodiments cognitively provide for taking into account a desired color of a food dish and visualizing an expected color or color profile for the food dish based on the colors of the contributing ingredients. The illustrative embodiments also cognitively provide for the ability of the user to adjust the color profile of a recipe by include a new ingredient and/or replacing an ingredient in order to in order to obtain a desired color for a final outcome of the food dish.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions that are executed by the at least one processor to cause the at least one processor to be configured to implement a recipe modification engine for modifying an existing recipe to meet a set of desired colors for a final food dish, the method comprising:

responsive to receiving a request to modify the existing recipe to meet the set of desired colors, the set of desired colors has at least one target color that is different from a set of existing colors of the final food dish, identifying, by a color classifier engine, at least one of the set of existing colors to be changed to meet the desired set of colors;

identifying, by the color classifier engine, an ingredient-action-sequence triplet associated with each at least one existing color to be changed in the existing recipe, wherein the ingredient-action-sequence triplet associated with each at least one existing color to be changed in the existing recipe is identified by the method comprising:

responsive to a corpus of existing recipes, each being accompanied with an image illustrating a result of the existing recipe, for each existing recipe:

separating, by an image identification engine, a foreground of the image from a background of the image;

clustering, by the image identification engine, areas of similar color in the foreground together;

generating, by a color classifier engine, a sparse binary feature vector representing the ingredient-action-sequence triplets found in the existing recipe, wherein each ingredient-action-sequence triplet represents an ingredient, an action performed with regard to the ingredient, and where in the existing recipe the ingredient and the action occurs; and marking, by the color classifier engine, each of the sparse binary feature vector with one or more positive examples of color;

using, by a support vector machine, the sparse binary feature vectors for the corpus of existing recipes to train a machine learning model;

searching, by the color classifier engine in the trained machine learning model, for a sparse binary feature vector that has a prominent weight, in conjunction with the ingredient-action-sequence triplet associated with each at least one existing color to be changed in the existing recipe; and identifying, by the color classifier engine, the ingredient-action-sequence triplet associated with each at least one existing color to be changed in the existing recipe from the identified sparse binary feature vector;

from a corpus of ingredient-action-sequence triplets associated with other existing recipes, identifying, by a recipe substitution engine, one or more substitution candidates that can produce the at least one target color;

ranking, by the recipe substitution engine, the one or more substitution candidates based on how each candidate pairs best with other ingredients in the existing recipe; and based on a selection of a substitution candidate from the one or more substitution candidates, modifying, by the recipe substitution engine, the existing recipe with the substitute candidate.

2. The method of claim 1, wherein the ingredient-action-sequence triplet associated with each at least one existing color to be changed in the existing recipe is identified by the method comprising:

responsive to the corpus of existing recipes, each being accompanied without the image illustrating the result of the existing recipe, for each existing recipe:

generating, by the color classifier engine, the sparse binary feature vector associated with each ingredient-action-sequence triplet of the existing recipe;

identifying, by the color classifier engine, one or more sparse binary feature vectors, from other sparse binary feature vectors of other existing recipes from a corpus of existing recipes each being accompanied without an image illustrating a result of the existing recipe that is similar to the generated sparse binary feature vector for the existing recipe failing to be accompanied with an image;

using, by the color classifier engine, each sparse binary feature vector of the one or more identified sparse binary feature vectors to predict the colors appearing in the final food dish; and marking, by the color classifier engine, each the sparse binary feature vector with one or more positive examples of color;

using, by the support vector machine, the sparse binary feature vectors for the corpus of existing recipes to train the machine learning model;

searching, by the color classifier engine in the trained machine learning model, for a sparse binary feature vector that has a prominent weight in conjunction with the ingredient-action-sequence triplet associated with each at least one existing color to be changed in the existing recipe; and identifying, by the color classifier engine, the ingredient-action-sequence triplet associated with each at least one existing color to be changed in the existing recipe from the identified sparse binary feature vector.

3. The method of claim 1, further comprising:

for each existing recipe, identifying, by an image identification engine, the area where the color appears in the final food dish; and generating, by the recipe modification system, a rudimentary image of the existing recipe showing the areas associated with each color in the existing recipe.

4. The method of claim 3, further comprising:

for each existing recipe, identifying, by a pattern classifier engine, patterns associated with the color of the ingredient-action-sequence triplet that appears in the final food dish; and modifying, by the recipe modification system, the rudimentary image of the existing recipe showing the patterns associated with each ingredient-action-sequence triplet in the existing recipe.

5. The method of claim 1, further comprising:

responsive to receiving a request to modify the existing recipe to meet a set of desired patterns, the set of desired patterns has at least one target pattern that is different from a set of existing patterns of the final food dish, identifying, by a pattern classifier engine, at least one of the set of existing patterns to be changed to meet the desired set of patterns;

identifying, by the pattern classifier engine, an ingredient-action-sequence triplet associated with each at least one existing pattern to be changed in the existing recipe;

from the corpus of ingredient-action-sequence triplet associated with other existing recipes, identifying, by the recipe substitution engine, one or more substitution candidates that can produce the at least one target pattern;

ranking, by the recipe substitution engine, the one or more substitution candidates based on how each candidate pairs best with other ingredients in the existing recipe; and based on a selection of a substitution candidate from the one or more substitution candidates, modifying, by the recipe substitution engine, the existing recipe with the substitute candidate.

6. The method of claim 1, further comprising:

receiving, by the recipe modification system, an indication of the target color from the user for the at least one existing color, wherein the indication is via hue/saturation slider or a color picking tool to indicate the target color.

7. The method of claim 1, further comprising:

receiving, by the recipe substitution engine, a target color and pattern to add to the existing recipe;

identifying, by the recipe substitution engine, a candidate set of ingredient-action-sequence triplets that match the target color and pattern to add to the existing recipe;

ranking, by the recipe substitution engine, the candidate set of ingredient-action-sequence triplets that match the target color and pattern to add to the existing recipe; and based on a selection of an ingredient-action-sequence triplet from the candidate set of ingredient-action-sequence triplets, modifying, by the recipe substitution engine, the existing recipe with the ingredient-action-sequence triplet.

8. A computer program product comprising a computer readable storage medium having a computer readable program stored therein, wherein the computer readable program, when executed on a computing device, causes the computing device to implement a recipe modification engine for modifying an existing recipe to meet a set of desired colors for a final food dish, and further causes the data processing system to:

responsive to receiving a request to modify an existing recipe to meet the set of desired colors, the set of desired colors has at least one target color that is different from a set of existing colors of the final food dish, identify, by a color classifier engine, at least one of the set of existing colors to be changed to meet the desired set of colors;

identify, by the color classifier engine, an ingredient-action-sequence triplet associated with each at least one existing color to be changed in the existing recipe, wherein the computer readable program identifies the ingredient-action-sequence triplet associated with each at least one existing color to be changed in the existing recipe by causing the computing device to:

responsive to a corpus of existing recipes, each being accompanied with an image illustrating a result of the existing recipe, for each existing recipe:

separate, by an image identification engine, a foreground of the image from a background of the image;

cluster, by the image identification engine, areas of similar color in the foreground together;

generate, by a color classifier engine, a sparse binary feature vector representing the ingredient-action-sequence triplets found in the existing recipe, wherein each ingredient-action-sequence triplet represents an ingredient, an action performed with regard to the ingredient, and where in the existing recipe the ingredient and the action occurs; and mark, by the color classifier engine, each of the sparse binary feature vector with one or more positive examples of color;

use, by a support vector machine, the sparse binary feature vectors for the corpus of existing recipes to train a machine learning model;

search, by the color classifier engine in the trained machine learning model, for a sparse binary feature vector that has a prominent weight in conjunction with the ingredient-action-sequence triplet associated with each at least one existing color to be changed in the existing recipe; and identify, by the color classifier engine, the ingredient-action-sequence triplet associated with each at least one existing color to be changed in the existing recipe from the identified sparse binary feature vector;

from, by a recipe substitution engine, a corpus of ingredient-action-sequence triplets associated with other existing recipes, identify one or more substitution candidates that can produce the at least one target color;

rank, by the recipe substitution engine, the one or more substitution candidates based on how each candidate pairs best with other ingredients in the existing recipe; and based, by the recipe substitution engine, on a selection of a substitution candidate from the one or more substitution candidates, modify the existing recipe with the substitute candidate.

9. The computer program product of claim 8, wherein the computer readable program identifies the ingredient-action-sequence triplet associated with each at least one existing color to be changed in the existing recipe by causing the computing device to:

responsive to the corpus of existing recipes, each being accompanied without the image illustrating the result of the existing recipe, for each existing recipe:

generate, by the color classifier engine, the sparse binary feature vector associated with each ingredient-action-sequence triplet of the existing recipe;

identify, by the color classifier engine, one or more sparse binary feature vectors, from other sparse binary feature vectors of other existing recipes from a corpus of existing recipes each being accompanied without an image illustrating a result of the existing recipe that is similar to the generated sparse binary feature vector for the existing recipe failing to be accompanied with an image;

use, by the color classifier engine, each sparse binary feature vector of the one or more identified sparse binary feature vectors to predict the colors appearing in the final food dish; and mark, by the color classifier engine, each the sparse binary feature vector with one or more positive examples of color;

use, by the support vector machine the sparse binary feature vectors for the corpus of existing recipes to train a machine learning model;

search, by the color classifier engine in the trained machine learning model, for a sparse binary feature vector that has a prominent weight in conjunction with the ingredient-action-sequence triplet associated with each at least one existing color to be changed in the existing recipe; and identify, by the color classifier engine, the ingredient-action-sequence triplet associated with each at least one existing color to be changed in the existing recipe from the identified sparse binary feature vector.

10. The computer program product of claim 8, wherein the computer readable program further causes the computing device to:

for each existing recipe, identify, by an image identification engine, the area where the color appears in the final food dish; and generate, by the recipe modification system, a rudimentary image of the existing recipe showing the areas associated with each color in the existing recipe.

11. The computer program product of claim 10, wherein the computer readable program further causes the computing device to:

for each existing recipe, identify, by a pattern classifier engine, patterns associated with the color of the ingredient-action-sequence triplet that appears in the final food dish; and modify, by the recipe modification system, the rudimentary image of the existing recipe showing the patterns associated with each ingredient-action-sequence triplet in the existing recipe.

12. The computer program product of claim 8, wherein the computer readable program further causes the computing device to:

responsive to receiving a request to modify the existing recipe to meet a set of desired patterns, the set of desired patterns has at least one target pattern that is different from a set of existing patterns of the final food dish, identify, by a pattern classifier engine, at least one of the set of existing patterns to be changed to meet the desired set of patterns;

identify, by the pattern classifier engine, an ingredient-action-sequence triplet associated with each at least one existing pattern to be changed in the existing recipe;

from the corpus of ingredient-action-sequence triplet associated with other existing recipes, identify, by the recipe substitution engine, one or more substitution candidates that can produce the at least one target pattern;

rank, by the recipe substitution engine, the one or more substitution candidates based on how each candidate pairs best with other ingredients in the existing recipe; and based on a selection of a substitution candidate from the one or more substitution candidates, modify, by the recipe substitution engine, the existing recipe with the substitute candidate.

13. An apparatus comprising:

a processor; and a memory coupled to the processor, Wherein the memory comprises instructions which, when executed by the processor, cause the processor to implement a recipe modification engine for modifying an existing recipe to meet a set of desired colors for a final food dish, and further cause the at least one processor to:

responsive to receiving a request to modify an existing recipe to meet the set of desired colors, the set of desired colors has at least one target color that is different from a set of existing colors of the final food dish, identify, by a color classifier engine, at least one of the set of existing colors to be changed to meet the desired set of colors;

identify, by the color classifier engine, an ingredient-action-sequence triplet associated with each at least one existing color to be changed in the existing recipe, wherein the computer readable program identifies the ingredient-action-sequence triplet associated with each at least one existing color to be changed in the existing recipe by causing the computing device to:

responsive to a corpus of existing recipes, each being accompanied with an image illustrating a result of the existing recipe, for each existing recipe:

separate, by an image identification engine, a foreground of the image from a background of the image;

cluster, by the image identification engine, areas of similar color in the foreground together;

generate, by a color classifier engine, a sparse binary feature vector representing the ingredient-action-sequence triplets found in the existing recipe, wherein each ingredient-action-sequence triplet represents an ingredient, an action performed with regard to the ingredient, and where in the existing recipe the ingredient and the action occurs; and mark, by the color classifier engine, each of the sparse binary feature vector with one or more positive examples of color;

use, by a support vector machine, the sparse binary feature vectors for the corpus of existing recipes to train a machine learning model;

search, by the color classifier engine in the trained machine learning model, for a sparse binary feature vector that has a prominent weight in conjunction with the ingredient-action-sequence triplet associated with each at least one existing color to be changed in the existing recipe; and identify, by the color classifier engine, the ingredient-action-sequence triplet associated with each at least one existing color to be changed in the existing recipe from the identified sparse binary feature vector;

from, by a recipe substitution engine, a corpus of ingredient-action-sequence triplets associated with other existing recipes, identify one or more substitution candidates that can produce the at least one target color;

rank, by the recipe substitution engine, the one or more substitution candidates based on how each candidate pairs best with other ingredients in the existing recipe; and based, by the recipe substitution engine, on a selection of a substitution candidate from the one or more substitution candidates, modify the existing recipe with the substitute candidate.

14. The apparatus of claim 13, wherein the instructions identify the ingredient-action-sequence triplet associated with each at least one existing color to be changed in the existing recipe by causing the computing device to:

responsive to the corpus of existing recipes, each being accompanied without the image illustrating the result of the existing recipe, for each existing recipe:

generate, by the color classifier engine, the sparse binary feature vector associated with each ingredient-action-sequence triplet of the existing recipe;

identify, by the color classifier engine, one or more sparse binary feature vectors, from other sparse binary feature vectors of other existing recipes from a corpus of existing recipes each being accompanied without an image illustrating a result of the existing recipe that is similar to the generated sparse binary feature vector for the existing recipe failing to be accompanied with an image;

use, by the color classifier engine, each sparse binary feature vector of the one or more identified sparse binary feature vectors to predict the colors appearing in the final food dish; and mark, by the color classifier engine, each the sparse binary feature vector with one or more positive examples of color;

use, by the support vector machine, the sparse binary feature vectors for the corpus of existing recipes to train a machine learning model;

search, by the color classifier engine in the trained machine learning model, for a sparse binary feature vector that has a prominent weight in conjunction with the ingredient-action-sequence triplet associated with each at least one existing color to be changed in the existing recipe; and identify, by the color classifier engine, the ingredient-action-sequence triplet associated with each at least one existing color to be changed in the existing recipe from the identified sparse binary feature vector.

15. The apparatus of claim 13, wherein the instructions further cause the processor to:

for each existing recipe, identify, by an image identification engine, the area where the color appears in the final food dish; and generate, by the recipe modification system, a rudimentary image of the existing recipe showing the areas associated with each color in the existing recipe.

16. The apparatus of claim 15, wherein the instructions further cause the processor to:

for each existing recipe, identify, by a pattern classifier engine, patterns associated with the color of the ingredient-action-sequence triplet that appears in the final food dish; and modify, by the recipe modification system, the rudimentary image of the existing recipe showing the patterns associated with each ingredient-action-sequence triplet in the existing recipe.

17. The apparatus of claim 13, wherein the instructions further cause the processor to:

responsive to receiving a request to modify the existing recipe to meet a set of desired patterns, the set of desired patterns has at least one target pattern that is different from a set of existing patterns of the final food dish, identify by a pattern classifier engine, at least one of the set of existing patterns to be changed to meet the desired set of patterns;

identify, by the pattern classifier engine, an ingredient-action-sequence triplet associated with each at least one existing pattern to be changed in the existing recipe;

from the corpus of ingredient-action-sequence triplet associated with other existing recipes, identify, by the recipe substitution engine, one or more substitution candidates that can produce the at least one target pattern;

rank, by the recipe substitution engine, the one or more substitution candidates based on how each candidate pairs best with other ingredients in the existing recipe; and based on a selection of a substitution candidate from the one or more substitution candidates, modify, by the recipe substitution engine, the existing recipe with the substitute candidate.

\* \* \* \* \*